March 19, 1940.   A. R. BONE ET AL   2,193,917
BIT EXTENSION
Filed Oct. 24, 1938   2 Sheets-Sheet 1
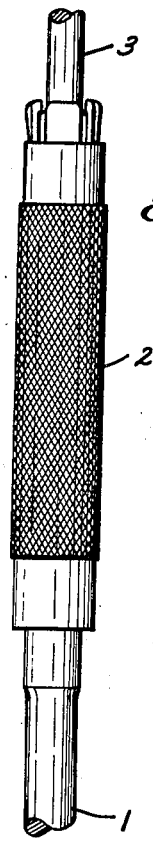
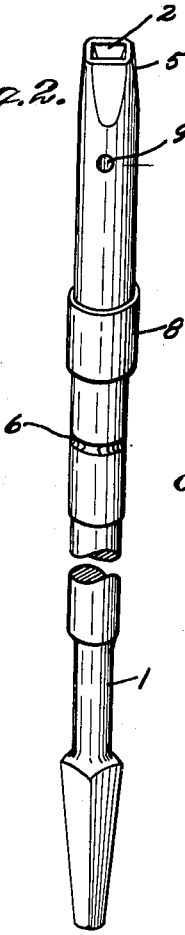
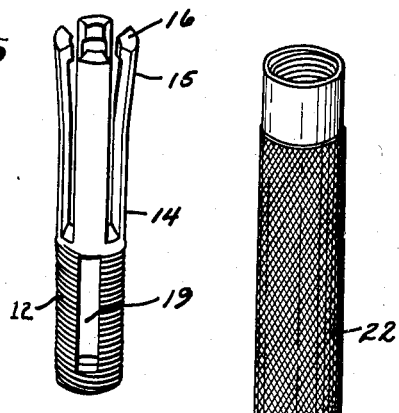
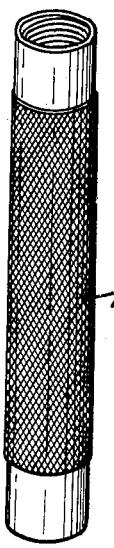
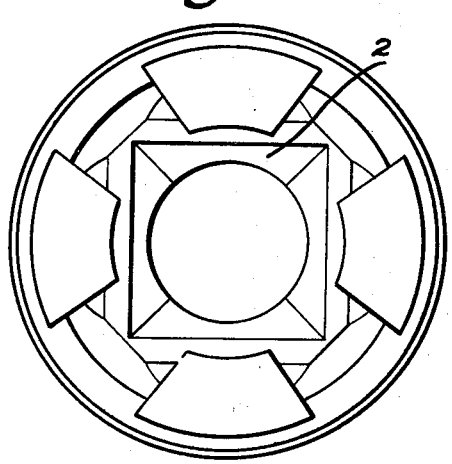
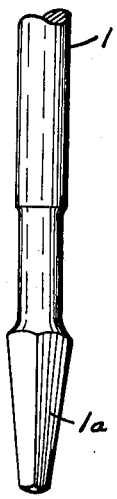
INVENTOR
ARNOLD R. BONE
ALFRED P. ALBRECHT
BY Paulmin & Paulmin
ATTORNEYS

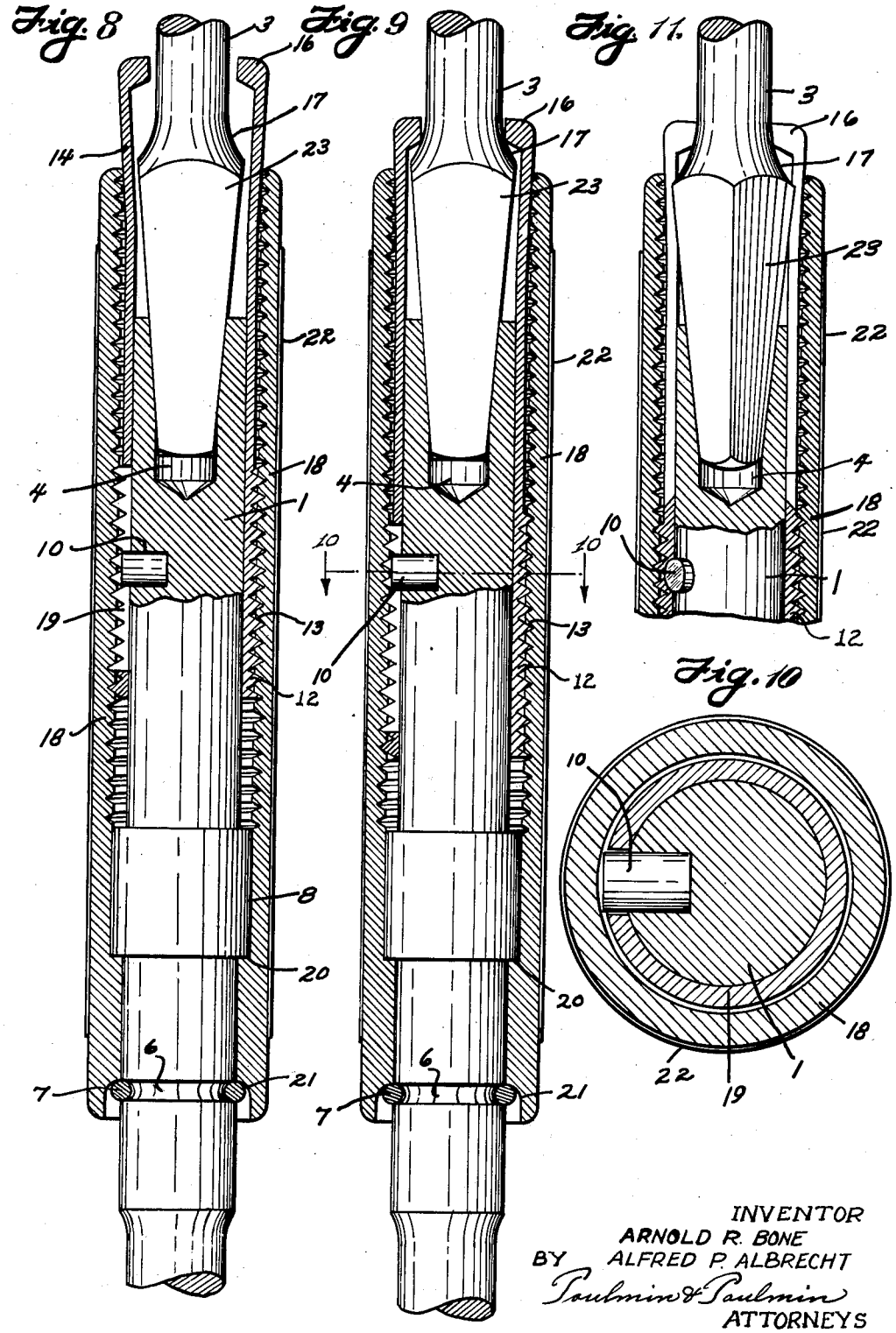

Patented Mar. 19, 1940

2,193,917

UNITED STATES PATENT OFFICE 2,193,917

BIT EXTENSION

Arnold R. Bone and Alfred P. Albrecht, Wilmington, Ohio, assignors to The Irwin Auger Bit Company, Wilmington, Ohio, a corporation of Ohio Application October 24, 1938, Serial No. 236,780

5 Claims. (Cl. 279—52)

The present invention relates to certain improvements in extension bits used in connection with braces, hand drills or screw drivers.

Bit extensions are employed in the art for increasing the effective length of a boring bit or screw driver, whereby holes of greater depth may be bored or screws turned at greater distances. Many devices of this character have been heretofore devised, but they are open to a number of objections, particularly by way of complicated structure, requiring considerable machine work which involves expense. Moreover, adequate provision has not heretofore been made for the wear of the bit or screw driver inserted in the bit extension. It is apparent that, even if the slightest play is permitted between the extension and the bit, this play develops considerable looseness at the joint very quickly due to the strain at the joint and the long lever distances between the brace and the work surfaces, thus causing eventual detachment of the bit and its extension. Still other prior forms of bit extensions fail to provide for the unevenness or lack of symmetry of the bit at the gripping position so that the bit is not firmly seated and held in the extension. Pin and slot arrangements have also heretofore been employed for holding the adjusting sleeve in place, and such arrangements often become loosened or detached when the bit is being moved in the reverse direction and away from the work surface.

The present invention obviates all of these difficulties in a practical manner and has for its primary object to construct a chuck for extension bits that can be made of a minimum number of parts, which is compact, strong and will accommodate bits having different lengths of tapered heads.

Another object is to construct an improved chuck which automatically provides for the wear or tear in any degree of the head or tang portion of the bit so that a strong gripping action is produced at all times by the chuck on the bit.

A still further object is to provide a chuck which maintains its grip on the bit when the bit is being turned in either direction, and the grip is not relaxed until the releasing means is operated.

Other objects and features will be apparent as the specification is perused in connection with the accompanying drawings, in which—

Figure 1 is an elevational view of the assembly of a bit extension improved in accordance with the present invention;

Figure 2 is a perspective, partially broken away, of the main shaft of the bit extension.

Figure 3 is a perspective of the pin 10.

Figure 4 is a perspective of the clamping ring 7.

Figure 5 is a perspective of the clamping jaw member.

Figure 6 is an enlarged end view of the clamping jaws of Figure 5.

Figure 7 is a perspective of the knurled sleeve mounted over the clamping jaws.

Figure 8 is an enlarged sectional view taken along the axis of the bit extension with the jaws out of clamping position, but showing their relative position with respect to the shoulder of bit;

Figure 9 is a similar view except that the jaws are shown in the clamping position about the shoulder of the bits;

Figure 10 is a cross sectional view taken along the line 10—10 in Figure 9, looking in the direction of the arrows; and Figure 11 is a fragmentary sectional view showing the bit extension turned approximately forty-five degrees from the position illustrated in Figure 9.

Referring to the drawings, numeral 1 designates the body portion or shank of the improved bit extension terminating in a rectangular head or tang portion 1a which is adapted to fit the opening in the chuck of a brace or drill to which it is applied. The body or shank portion is constituted of a number of sections of different diameters, as shown more particularly in Figure 2, and terminates at its upper end in a rectangularly shaped opening 2 which is tapered to fit the head of a bit 3 or screw driver which necessitates an extension. This opening is of a depth sufficient to leave considerable clearance at the lower end of the bit 3. The upper end of the body portion 1 is preferably tapered as indicated at 5 in Figure 2 so as to provide a rectangular wall about the opening 2.

Approximately midway between the ends of the body portion 1, there is a circular groove 6 which is adapted to receive a snap ring 7, the purpose of which will be explained hereinafter. Just above this groove, an enlargement or collar 8 is provided, the lower edge of which is adapted to seat itself upon an abutment provided in a casing which surrounds the body portion and which will be described presently. Finally, the body portion has an opening indicated at 9 (Figure 2), into which is driven a pin 10, the purpose of which will also be explained hereinafter.

As shown more clearly in Figures 8 to 11 inclusive, the body portion 1 is surrounded by a sleeve 12 which terminates at its lower end in a threaded portion indicated at 13. The other or upper end carries four or more jaws 14 which are shown most clearly in Figure 5. These jaws take on an arcuate form and are separate from one another, except where they join the sleeve and are flared outwardly, as indicated at 15, for reasons which will be explained hereinafter. The metal of these jaws is preferably treated in such a manner that they have a strong spring action. The jaws terminate at their upper end in an overhanging portion indicated at 16, which is adapted to engage the shoulder portion 17 of the bit 3 when the jaws are in a compressed condition. The amount of overhang is determined by the extent of the shoulder provided on the bit 3.

There is also provided an adjustment casing 18 which surrounds the sleeve 12 and has screw threads on its interior surface, which mesh with the threads on the sleeve. These threads are so biased that, by turning the casing in a left-hand or clockwise direction, looking down from the top, the sleeve moves downwardly into the casing.

The sleeve is prevented from rotating with respect to the body portion 1 by means of the pin 10, referred to hereinbefore, which is received by a slot 19 in the threaded portion of the sleeve. The casing 18 is provided near its lower end with an annular ledge indicated at 20, on which abuts the lower surface of the collar 8 to prevent the body portion 1 from moving downwardly with respect to the casing. For preventing movement in the other longitudinal direction, the casing has, at its lowermost extremity, an undercut groove 21 which provides a seat for the snap ring 7. Thus, the collar 8 and the snap ring 7 prevent longitudinal movement in either direction between the body portion 1 and the casing 18.

The casing has a roughened or knurled portion on the exterior, as indicated at 22 (Figures 1 and 7), which forms a hand hold by which the casing is turned. When the knurled portion of the casing is grasped by the hand and turned to the left, while the body portion 1 is held stationary in any convenient manner, the sleeve 12 moves downwardly into the casing and carries with it the jaws 14. The outside diameter of these jaws at their flared portion is such that the jaws contact with the inside upper edge of the casing so that, as the sleeve is moved downwardly, the flared jaws are compressed or moved inwardly due to the restraining effect exerted by the upper end of the casing. It is apparent that the construction and arrangement of the elements are such that the body portion 1 and the casing 18 maintain their relative longitudinal position with respect to one another and only the sleeve moves longitudinally with respect to these elements when the casing is rotated.

In order to operate the chuck, the jaws 14 are opened as wide as is necessary to clear the rectangular head 23 of the bit 3 by turning the casing 18 as much as is necessary to the right, thus moving the sleeve 12 upwardly on the screw threads. The head 23 is then pushed through the jaws into the rectangular opening 2 as far as it will go. The position of just receiving the bit 3 is shown in Figure 8. After the opening 2 has received the head of the bit, the casing 18 is rotated to the left, which, as stated hereinbefore, operates to pull the sleeve downwardly and to cause the overhanging portion 16 of the jaws 14 to recede toward the casing and finally to make a gripping contact with the shoulder 17 of the bit 3. A gripping action of the most intense character can be obtained by providing the proper fineness of pitch on the screw threads.

As shown more especially in Figures 3 and 5, the jaw portions 16 contact the shoulders 17 only over surfaces of restricted area. Consequently, if there is any pitting or other unevenness of this area, the jaws of restricted surface can still make a firm contact with the necessary portions of the shoulder. It will be noted that, in case of extreme wear of the shoulder 17, it is only necessary to give the casing a few extra turns and thereby bringing the jaws 16 an additional distance downwardly to accommodate this wear. It is also evident that this same adjustment takes up any wear of the rectangular head 23 or of the rectangular opening 2. The clearance at the bottom of the opening 4 is provided to permit the head of the bit to descend further into the body portion when occasion requires it. In order that the portions 16 of the jaws will seat themselves as firmly as possible on the shoulder 17, the jaws are arranged preferably along each side of the rectangular opening 2, as shown in Figure 6, so that the corners of the head 23 of the bit extend into the openings or slots between the jaws. The fact that the jaws are in line with the flat portions of the head 23 and do not encompass the corners is also indicated in Figure 11, in which a cross section taken through the diagonals of the head 23 would not cut any of the jaws as indicated by the lack of cross sectional lines on the jaws.

After the opening 2 has received the head 23 and the jaw portions 16 are placed in gripping position by rotating the casing 13 to the left, it will be found that the bit 3 will be held firmly in the chuck and will remain in this position until released by turning the casing to the right. The latter movement causes the sleeve 12 to move upwardly and carry the body portions 16 away from the shoulder 17 due to the spring action of the jaws which are no longer compressed by the upper inside edge of the casing.

It is evident from the foregoing that our improved bit extension is of a very simple character necessitating only three main elements, namely, the body portion 1, the combined sleeve and jaw device 12, and the casing 22. The body portion preferably is made out of forged steel, the sleeves 12 out of casehardened steel in order to impart a springy resilience to the jaws 14, and the casing 22 may be made out of cold rolled steel tubing. The amount of machining required on these parts is a minimum. Furthermore, the arrangement is such that any amount of adjustment may be automatically obtained for taking up wear either on the shoulder or the head of the bit or in the opening in the body portion which receives the head. There is no slot and pin mechanism necessary in the casing to prevent an accidental release of the jaws, because the jaws cannot open until the casing is rotated. The pin and slot arrangement 10, 19 is concealed under the casing and is used solely for the purpose of preventing the sleeve 12 from being rotated when the casing 18 is being rotated. After the casing has been rotated to clamping position, the pin and slot actually serve no purpose insofar as the effectiveness of the clamping action is concerned and takes on its function only when the casing 18 is being turned to the release position.

It will be understood that we desire to comprehend within our invention such modifications as come within the scope of the claims and the invention.

Having thus fully described our invention, what we claim as new and desire to secure by Letters Patent is:

1. In combination, a chuck comprising a body portion having an opening to receive the shank of a bit, a sleeve secured to said portion and adapted to move longitudinally with respect thereto, said sleeve carrying a clamping means for gripping the shoulder of the bit, a casing mounted on the sleeve and adapted to move longitudinally with respect thereto, and means responsive to a recession of the sleeve into the casing for operating said clamping means and for moving the bit with respect to said body portion into the opening.

2. In combination, a chuck extension for a bit comprising a body portion, a sleeve secured to said portion and adapted to move longitudinally with respect thereto, said sleeve carrying a set of spring jaws for gripping the shoulder of the bit, a casing surrounding the sleeve and adapted to compress said jaws when the sleeve is moved longitudinally into the casing, and means for causing longitudinal movement between the casing and sleeve when the casing is rotated whereby the jaws are caused to grip the shoulder of the bit and to move the bit longitudinally with respect to said casing.

3. In combination, a chuck comprising a body portion having an opening to receive the shank of a bit, a sleeve secured to said portion and adapted to move longitudinally with respect thereto, said sleeve carrying a set of spring jaws for gripping the shoulder of the bit, a casing surrounding the sleeve and adapted to compress the jaws when the sleeve is moved longitudinally with respect to the casing, means for causing longitudinal movement between the casing and sleeve when the casing is rotated, means for preventing longitudinal movement between the body portion and the casing whereby the sleeve is moved with respect to the body portion when the casing is rotated, and means including said casing for closing the jaws to compress and grip the shoulder of the bit when the sleeve is moved whereby the bit is forced into the opening of the body portion.

4. In combination, a chuck comprising a body portion having an opening to receive a bit, a sleeve surrounding said portion, means for preventing rotation between the body portion and sleeve but permitting longitudinal movement therebetween, said sleeve carrying jaws adapted to engage the shoulder of the bit upon longitudinal movement of the sleeve, a casing rotatably mounted on the sleeve, means for preventing longitudinal movement between the body portion and the casing but permitting rotational movement therebetween, said sleeve and casing being provided with screw threads which cause the sleeve to move longitudinally with respect to the casing and said body when the casing is rotated, and means for compressing the jaws about the shoulder of said bit when the sleeve is moved longitudinally whereby the bit is forced into the opening when the casing is rotated.

5. In combination, a chuck comprising a body portion having an opening to receive the head of a bit, a sleeve surrounding said portion, means for preventing rotation between the body portion and the sleeve but permitting longitudinal movement therebetween, said sleeve carrying jaws adapted to engage the shoulder of said bit upon longitudinal movement of the sleeve, a casing rotatably mounted on the sleeve, said jaws being contained within the casing and extending into divergent directions from one end thereof, the outer surface of said jaws contacting with the inner edge of the casing whereby a longitudinal movement of the combined sleeve and jaws causes the edge of the casing to compress the jaws, and means for moving the sleeve longitudinally with respect to said body portion and casing whereby the jaws clamp about the shoulder of the bit to force the bit into the opening of said body portion.

ARNOLD R. BONE.
ALFRED P. ALBRECHT.